Patented Feb. 19, 1935

1,991,732

UNITED STATES PATENT OFFICE 1,991,732

PROCESS FOR THE PRODUCTION OF FORMIC ACID

Gilbert B. Carpenter, Bellemoor, Del., assignor to E. I. du Pont de Nemours & Company, Wilmington, Del., a corporation of Delaware No Drawing. Application August 24, 1931, Serial No. 559,128

2 Claims. (Cl. 260—114)

This invention relates to a process for the preparation of formic acid from carbon monoxide and steam and is directed particularly to the use of a new catalyst for the reaction.

It has been known that carbon monoxide and steam will react, in the presence of a suitable catalyst, to give formic acid. As this process is one which employs raw materials that are relatively inexpensive, it should, under favorable conditions, produce the acid at an exceptionally low cost. Its commercial success, however, will in no small part be determined by the catalyst used. Those which have been proposed heretofore have not been entirely satisfactory for commercial operation due to low yield, short life, and other economic considerations. Efforts of investigators in this art have been directed, therefore, to the discovery of catalysts having high activity and which, furthermore, favor the production of formic acid while tending to inhibit the formation of undesirable side products.

An object of the present invention is to provide new catalysts for the preparation of formic acid from carbon monoxide and steam having the above desirable characteristics. Other objects will hereinafter appear.

According to the present invention formic acid can be prepared from carbon monoxide and steam by contacting these materials in the vapor phase in the presence of a hydrogen halide and a metallic halide. The metallic halides which are well suited for this purpose include the alkali and alkaline earth metal halides, viz. the bromides, chlorides, and iodides of lithium, sodium, potassium, rubidium, caesium, calcium, strontium, magnesium, and barium as well as the halides of the following metals: tin, iron, cobalt, nickel, bismuth, manganese, lead, tellurium, zinc, and cadmium. The metallic halide may be used alone or admixed with one or more dissimilar metallic halides. It may also be unsupported or supported on activated charcoal, fuller's earth, kieselguhr, etc. The reaction may be effected advantageously, in some instances, by passing the hydrogen halide in the vapor phase together with the gaseous reactants into the catalytic reaction chamber in which the halides of the elements are disposed.

A number of basic elements may be used as the catalyst over which the hydrogen halide is passed. The elements above described as oxides or as salts of acids (e. g. as carbonates, acetates, etc.) readily reduced under working conditions will rapidly be converted wholly or partly to a halide which will then co-act with the hydrogen halide as a catalyst.

The carbon monoxide required for this synthesis may conveniently be derived from various commercial sources, such as, for example, water-gas, producer gas, etc., by liquefaction or other methods, and should likewise for the best results be relatively pure.

Inert gases, such as nitrogen, carbon dioxide, etc., may be included with the reactants, this being advantageous in some cases from the standpoint of controlling the temperature of the exothermic reaction and of limiting the extent thereof, or it may be desired to restrict the overall conversion of the reaction for the sake of enhancing the relative yield of formic acid.

I prefer generally to conduct the reaction at pressures in excess of atmospheric, say from 25–900 atmospheres. The reaction proceeds over a wide range of temperatures employing the above described catalyst, depending upon the gaseous composition employed. Generally the desired conversion of the carbon monoxide and steam to formic acid can be obtained at a temperature of from 100–400° C., although I generally prefer to conduct the reaction in the range of from 200–300° C.

The following examples will illustrate one method of practicing the invention, although the invention is not limited thereto.

*Example 1.*—A gaseous mixture containing, by volume, 90 parts carbon monoxide, and 20 parts steam, is passed together with approximately 5 parts of hydrogen chloride into a conversion chamber containing a zinc chloride catalyst disposed upon activated charcoal. The catalyst is prepared by saturating the activated charcoal with a solution of zinc chloride of sufficient concentration to give a charcoal containing approximately 20% by weight of zinc chloride. The catalyst chamber is designed for carrying out exothermic gaseous reactions under pressure and the temperature maintained therein at approximately 300° C. while the pressure is held at approximately 700 atmospheres. The condensate obtained upon cooling the converted gases will give a good yield of formic acid.

*Example 2.*—A gaseous mixture having a composition similar to that employed in Example 1 is passed with 5 parts of hydrogen bromide, in lieu of the hydrogen chloride therein used, into a conversion chamber containing granulated sodium bromide. By maintaining a temperature of approximately 300° C. and a pressure in the neighborhood of 600 atmospheres a good yield of formic acid will be realized.

The apparatus which may be employed for conducting the reaction may be of any conventional type and preferably one in which the temperature of exothermic reactions can be readily controlled at the desired temperature. Owing to the corrosive action of formic acid, the interior of the converter and conduits therefrom should preferably be protected. This may be accomplished by using glass or glass-lined apparatus or by coating the inner surfaces of the apparatus with chromium or silver or using for the construction of this equipment acid-resisting alloys of, for example, molybdenum, cobalt, tungsten, chromium, manganese, or nickel.

Various changes may be made in the method of employing the above catalysts for the preparation of formic acid from carbon monoxide and steam without departing from this invention or sacrificing the advantages that may be derived therefrom.

I claim:

1. In a process of producing formic acid from a gaseous mixture containing carbon monoxide and steam the step which comprises passing the gaseous mixture over a zinc chloride catalyst while in the presence of hydrogen chloride.

2. In a process for the preparation of formic acid the step which comprises admixing hydrogen chloride with carbon monoxide and steam and passing the resulting gaseous mixture over a zinc chloride catalyst.

GILBERT B. CARPENTER.